(12) United States Patent
Lindmark et al.

(10) Patent No.: US 9,573,626 B2
(45) Date of Patent: Feb. 21, 2017

(54) INNER PANEL FOR A VEHICLE BONNET

(71) Applicant: VOLVO CAR CORPORATION, Gothenburg (SE)

(72) Inventors: Peter Lindmark, Hisings Backa (SE); Anders Fredriksson, Gothenburg (SE); Magnus Oldenbo, Gothenburg (SE); Jonas Backlund, Gothenburg (SE); Peter Hansson, Hisings-Karra (SE)

(73) Assignee: VOLVO CAR CORPORATION (SE)

( * ) Notice: Subject to any disclaimer, the term of this patent is extended or adjusted under 35 U.S.C. 154(b) by 31 days.

(21) Appl. No.: 14/689,184

(22) Filed: Apr. 17, 2015

(65) Prior Publication Data
US 2015/0307135 A1 Oct. 29, 2015

(30) Foreign Application Priority Data

Apr. 24, 2014 (EP) ..................................... 14165821

(51) Int. Cl.
*B60N 99/00* (2006.01)
*B62D 25/12* (2006.01)
*B62D 25/10* (2006.01)
*B60R 21/34* (2011.01)

(52) U.S. Cl.
CPC ............... *B62D 25/12* (2013.01); *B60R 21/34* (2013.01); *B62D 25/105* (2013.01); *B60R 2021/343* (2013.01)

(58) Field of Classification Search
CPC ....... B62D 25/12; B62D 25/105; B60R 21/34; B60R 2021/343
See application file for complete search history.

(56) References Cited

U.S. PATENT DOCUMENTS

2013/0175827 A1 7/2013 Hashimoto et al.
2014/0015285 A1* 1/2014 Ishitobi ............... B62D 25/105
296/193.11

FOREIGN PATENT DOCUMENTS

EP 1518781 A2 3/2005
EP 2692615 A1 2/2014
JP 2010116074 A 5/2010

OTHER PUBLICATIONS

Extended European Search Report Dated Oct. 7, 2014, Application No. 14165821.1-1760, Applicant Volvo Car Corporation, 6 Pages.

* cited by examiner

*Primary Examiner* — Lori L Lyjak
(74) *Attorney, Agent, or Firm* — Brooks Kushman P.C.

(57) ABSTRACT

The present disclosure relates to an inner panel for a vehicle bonnet. The inner panel comprises a peripheral portion, extending along at least a portion of a periphery of the inner panel, and a central portion, located within the peripheral portion. The central portion has a longitudinal extension and a transverse extension. The central portion comprises a reinforcing framework, a portion of which forms an arch-shaped member. A longitudinal extension of the arch-shaped member is equal to or greater than 30% of the longitudinal extension of the inner panel. A transverse extension of the arch-shaped member is equal to or greater than 40% of the transverse extension of the inner panel. The disclosure further relates to a bonnet comprising such an inner panel and an outer panel.

20 Claims, 4 Drawing Sheets

INNER PANEL FOR A VEHICLE BONNET

CROSS-REFERENCE TO RELATED APPLICATIONS

This application claims foreign priority benefits under 35 U.S.C. §119(a)-(d) to European patent application number EP 14165821.1, filed Apr. 24, 2014, which is incorporated by reference in its entirety.

TECHNICAL FIELD

The present disclosure relates to an inner panel for a vehicle bonnet. The disclosure further relates to a bonnet comprising such an inner panel and an outer panel.

BACKGROUND

An engine compartment of a vehicle, such as a car, is normally covered by a bonnet. The bonnet is also known as hood, e.g., in American English.

A bonnet commonly comprises an inner panel and an outer panel attached to each other. The outer panel provides the bonnet with an outer surface, while the inner panel contributes to provide the bonnet with the desired mechanical properties.

There are a lot of demands and desires for a bonnet. It should have appropriate mechanical properties, e.g., panel rigidity, dent resistance, flexural rigidity and torsional rigidity. Further, the bonnet should be forgiving in case a vulnerable road user would be thrown onto the bonnet. In addition, it is desired that the bonnet does not weigh too much, since that would add to a total weight of the vehicle, e.g., increasing fuel consumption.

Patent document EP 2 692 615 A1 discloses a bonnet panel comprising an inner panel and an outer panel. The document EP 2 692 615 A1 further describes the above-mentioned mechanical properties.

SUMMARY

An object of the present disclosure is to overcome or ameliorate at least one of the disadvantages of the prior art, or to provide a useful alternative.

By utilizing an inner panel according to claim 1 an inner panel is provided, which has a desired level of the above-mentioned mechanical properties and yet does not weigh too much. Further, a bonnet comprising such an inner panel, is forgiving if a vulnerable road user would be thrown onto the bonnet.

In a first aspect of the present disclosure there is provided an inner panel for a vehicle bonnet. The inner panel comprises a peripheral portion extending along at least a portion of a periphery of the inner panel and a central portion located within the peripheral portion. The central portion has a longitudinal extension and a transverse extension. The central portion comprises a reinforcing framework. A portion of the framework forms an arch-shaped member. A longitudinal extension of the arch-shaped member is equal to or greater than 30% of the longitudinal extension of the inner panel. A transverse extension of the arch-shaped member is equal to or greater than 40% of the transvers extension of the inner panel.

The peripheral portion provides seats for one or more bonnet hinges and one or more bonnet latches. The bonnet hinges, often one adjacent to each lateral side of the inner panel, are arranged to provide a hinged connection between the bonnet and a vehicle body to allow opening of the bonnet for maintenance and/or repair. The bonnet latch/latches, e.g., one adjacent to each lateral side of the inner panel or one close to a longitudinal center-line of the inner panel, is/are arranged to be able to retain the bonnet in a closed position.

The peripheral portion extends along at least a portion of a periphery of the inner panel, when seen in a plane coinciding with the longitudinal and transverse directions. Preferably the peripheral portion extends along the whole periphery of the inner panel thus forming a frame of the inner panel, the frame helping to provide the inner panel with peripheral stability.

The longitudinal extension is the extension in a longitudinal direction. For the inner panel and the central portion the longitudinal extension is determined along a longitudinal center-line. For the arch-shaped member the longitudinal extension is the longest extension in the longitudinal direction, which may be located along the longitudinal center-line or may be located off the longitudinal center-line.

The transverse direction is the extension in a transverse direction. The transverse extension is determined at the widest portion of the inner panel, the central portion or the arch-shaped member, as seen in the transverse direction. The longitudinal and the transverse directions are perpendicular to each other and coincide with the longitudinal and the transverse direction of a vehicle, in which the inner panel is mountable as a part of the bonnet. The longitudinal direction coincides with the normal running direction of the vehicle and the transverse direction goes from a first lateral side to a second lateral side of the vehicle. There is further a vertical direction, which is perpendicular to the longitudinal and the transverse direction.

The inner panel may have a substantially rectangular shape, or a rectangular shape with rounded corners, when seen in a plane coinciding with the longitudinal and transverse directions. However, often a front end of the inner panel is less wide than a rear end, the rear end being located adjacent to a windscreen of the vehicle, e.g., such that the inner panel forms a trapezoid. The central portion may have a shape corresponding to that of the inner panel.

The framework is utilized to provide the central portion with desired mechanical properties, e.g., regarding stiffness and torsional rigidity. The framework may comprise reinforcing ribs. The use of a framework is advantageous, since the mechanical properties may be obtained at a lower weight as compared to e.g., the central portion being a sheet of material.

The arch-shaped member has an arch shape in a plane coinciding with the longitudinal and transverse directions. The arch shape provides an inner panel having appropriate mechanical properties, e.g., as regards being able to withstand being pressed down by manual force, e.g., in the center of the central portion, and torsional rigidity, e.g., diagonally over the central portion, and yet keeping the weight at desired low level. In addition, the bonnet comprising the inner panel has appropriate properties as regards protection of a vulnerable road user being thrown onto the bonnet.

The shape of the arch-shaped member may be selected, such that it spans more than half of the central portion both in the longitudinal and the transverse direction, when seen in a plane coinciding with the longitudinal and transverse directions. The arch-shaped member may have its apex at or adjacent to the longitudinal center-line of the inner panel.

The longitudinal extension of the arch-shaped member is, as mentioned above, defined as its longest longitudinal extension, which in many cases is located along the longitudinal center-line, e.g., for the case the arch-shaped member is symmetric around the longitudinal center-line. The longitudinal extension of the arch-shaped member is equal to or greater than 30% of the longitudinal extension of the inner panel. The longitudinal extension of the arch-shaped member may be equal to or greater than 35%, preferably 40% of the longitudinal extension of the inner panel.

The longitudinal extension of the arch-shaped member may be equal to or greater than 60% but less than or equal to 100% of the longitudinal extension of the central portion of the inner panel. The longitudinal extension of the arch-shaped member may preferably be equal to or greater than 65% but less than or equal to 90%, more preferably equal to or greater than 70% but less than or equal to 85% of the longitudinal extension of the central portion.

The transverse extension of the arch-shaped member is defined as its widest transverse extension, which may between a first and a second end portion located adjacent to the windscreen. The transverse extension of the arch-shaped member is equal to or greater than 40% of the transverse extension of the inner panel. The transverse extension of the arch-shaped member may be equal to or greater than 50%, preferably 60% of the transverse extension of the inner panel.

The transverse extension of the arch-shaped member may be equal to or greater than 60% but less than or equal to 100% of the transverse extension of the central portion of the inner panel. The transverse extension of the arch-shaped member may be equal to or greater than 65%, preferably equal to or greater than 70%, more preferably equal to or greater than 80% and most preferably equal to or greater than 90% of the transverse extension of the central portion.

The arch-shaped member may partly, but however not completely, coincide with the inner rim of the peripheral portion.

The radius of curvature may vary along the arch-shaped member. In that case, the arch-shaped member does not have the shape of a single circle or a single circle segment.

A portion of the arch-shaped member may have a substantially circular, parabolic or elliptic shape. Substantially the whole of the arch-shaped member, or the whole, may have a substantially parabolic or elliptic shape. It is also feasible that the arch-shaped member may have a shape constituted by a plurality of curve segments, wherein one or more of the curve segments may follow e.g., a circular shape, an elliptic shape or a parabolic shape. It would also be feasible that one or more portion of the arch-shaped member is/are rectilinear. In principle, any arch-shaped shape, e.g., as known from architecture, would be possible.

As mentioned above, the bonnet hinge is often located adjacent to a lateral side of the inner panel. It is common to use two bonnet hinges, one at each lateral side of the bonnet. The bonnet hinge may be located adjacent to the rear end of the inner panel. However, there are other bonnets, wherein a bonnet hinge is placed in other locations, such as adjacent to the front end of the inner panel. The inner panel as described herein is usable for both of these locations of the bonnet hinges.

The arch-shaped member may comprise a first end portion and a second end portion, wherein at least one of the end portions joins the peripheral portion adjacent to a seat for a bonnet hinge. If the bonnet hinge/hinges are located at the front end of the inner panel, the at least one of the end portions may join the peripheral portion adjacent to a seat for a bonnet latch. The end portions of the arch-shaped member are then located at the portion of the framework, which is adjacent to the windscreen of the vehicle.

The arch-shaped member may extend from the peripheral portion adjacent to a seat for a first bonnet hinge to the peripheral portion adjacent to a seat for a second bonnet hinge. Thereby it is ascertained that the reinforcing framework is connected to the peripheral portion close to the seats of the bonnet hinges, which seats are examples of locations, where forces are applied to the inner panel. It is thus desirable to have a strong framework there.

The framework may further comprise a latch member extending between the arch-shaped member and the peripheral portion adjacent to a seat for a bonnet latch. In particular, the framework may comprise a first latch member extending between the arch-shaped member and the peripheral portion adjacent to a seat for a first bonnet latch and a second latch member extending between the arch-shaped member and the peripheral portion adjacent to a seat for a second bonnet latch.

Thereby it is ascertained that the framework is connected to the peripheral portion close to the seats of the bonnet latch/latches, which seats is/are examples of locations, where forces are applied to the inner panel. Usually the bonnet latch/latches is/are located at the opposite end of the bonnet as compared to the bonnet hinges.

The above-described configuration of the end portions of the arch-shaped member, optionally together with the latch members, helps to provide an inner panel with appropriate properties as regards to being able to withstand being pressed down by manual force, e.g., in the center of the central portion, and torsional rigidity, e.g., diagonally over the central portion, and yet keeping the weight at desired low level. In addition, the bonnet comprising the inner panel has appropriate properties as regards protection of a vulnerable road user landing on the bonnet.

If using the first and second end portions and the first and second latch members as described above, the inner panel will have a reinforcement from any selected corner substantially towards all of the other corners. This would in that case be true for all four corners. This is beneficial in order to obtain the desired mechanical properties.

The framework may further comprise at least one secondary framework having a smaller longitudinal and/or a smaller transverse extension than the arch-shaped member, when seen in a plane coinciding with the longitudinal and transverse directions. The at least one secondary framework is located within the arch-shaped member when seen in a plane coinciding with the longitudinal and transverse directions. The secondary framework is used to provide appropriate mechanical properties to the portion of the inner panel being located inside the arch-shaped member. As an example, the secondary framework may help to prevent the center of the bonnet from being pressed down by manual force.

The at least one secondary framework may comprise an inner arch-shaped member. The inner arch-shaped member may have the same general shape as the arch-shaped member or they may have different shapes. The inner arch-shaped member may assume any of the shapes described above for the arch-shaped member. The inner arch-shaped member may be symmetrically located in relation to the arch-shaped member. The arch-shaped member and the inner arch-shaped member may partly substantially coincide, e.g., adjacent to the longitudinal center-line. The inner arch-shaped member may have its apex at or adjacent to the longitudinal center-line. The apexes of the arch-shaped member and the inner arch-shaped member may coincide.

There may be one, two, three or more inner arch-shaped members arranged within each other and/or beside each other.

In addition to, or as a complement to, the inner arch-shaped member, the secondary framework may comprise a sun-shaped member comprising a central ring and one or more connection members extending from the central ring to the arch-shaped member, to the inner arch-shaped member, if the framework includes an arch-shaped member, and/or to the peripheral portion. The sun-shaped structure may be located within the arch-shaped member or within the inner arch-shaped member, if any. The central ring may e.g., be circular, oval, elliptic, polygonal, such as square, pentagonal, hexagonal or octagonal, or polygonal with rounded corners.

The sun-shaped structure may comprise a first connection member extending from the central ring in a direction towards the seat of the first bonnet latch, a second connection member extending from the central ring in a direction towards the seat of the second bonnet latch, a third connection member extending from the central ring in a direction towards the seat of the first bonnet hinge and/or a fourth connection member extending from the central ring in a direction towards the seat of the second bonnet hinge. The term "extending in a direction towards" is herein utilized to denote a direction; it does not mean that the connection members reach as far as to the seat of the bonnet latch or hinge.

The framework may comprise a front connection extending substantially in the longitudinal direction adjacent to the longitudinal center-line of the inner panel connecting the arch-shaped member with the peripheral portion. The front connection may comprise one, two, three, four or more members.

The inner panel may comprise at least one open area. The open area may be located in between the elements of the framework or between one and more of the elements of the framework and the peripheral portion. In general, the open areas may be designed such that the corners of the open area are not too pointed when seen in a plane coinciding with the longitudinal and transverse directions, e.g., not assuming an angle below 45°.

As an alternative to, or as a complement, to utilizing open areas, the regions between the members of the framework may comprise a thinner material than the framework, e.g., a thin metal sheet.

In a second aspect of the present disclosure there is provided a bonnet for a vehicle. The bonnet comprises an inner panel as described herein and an outer panel, the inner panel being attached to the outer panel, e.g., by means of an adhesive and/or hemming.

In a third aspect of the present disclosure there is provided a vehicle comprising the bonnet with an inner panel as described herein and an outer panel, the inner panel being attached to the outer panel.

BRIEF DESCRIPTION OF THE DRAWINGS

The present disclosure will hereinafter be further explained by means of non-limiting examples with reference to the appended drawings, wherein.

It should be noted that the appended drawings are not necessarily drawn to scale and that the dimensions of some features of the present disclosure may have been exaggerated for the sake of clarity.

DETAILED DESCRIPTION

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other.

Figure 1:
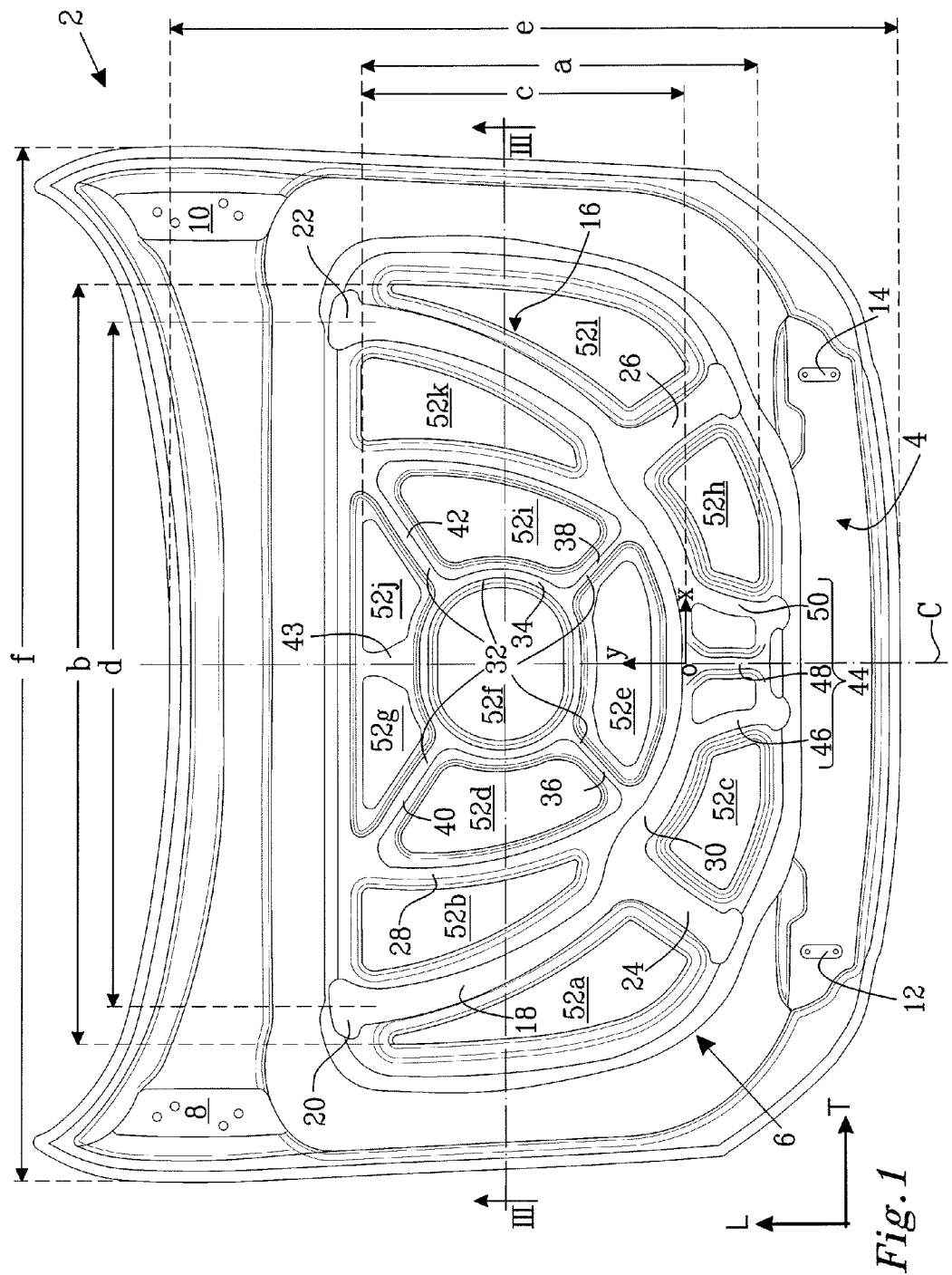
FIG. 1 shows an inner panel for a vehicle bonnet.

FIG. 1 illustrates an inner panel 2 for a vehicle bonnet. The inner panel 2 is intended to be combined with an outer panel to form the bonnet, which is described below in conjunction with FIGS. 2 and 3. The inner panel 2 has a longitudinal direction L and a transverse direction T coinciding with a longitudinal direction and a transverse direction of a vehicle, wherein the bonnet is intended to be mounted. A longitudinal center-line C of the inner panel 2 defines two lateral halves, which in the illustrated embodiment are symmetrical to each other as mirror images, but which also may differ from each other.

The inner panel 2 comprises a peripheral portion 4 extending along at least a portion of a periphery of the inner panel 2 and a central portion 6 located within the peripheral portion 4. The peripheral portion 4 provides a seat 8 for a first bonnet hinge, a seat 10 for a second bonnet hinge, a seat 12 for a first bonnet latch and a seat 14 for a second bonnet latch. The bonnet hinges, not illustrated, are arranged to provide a hinged connection between the bonnet and a vehicle body to allow opening of the bonnet for maintenance and/or repair. The bonnet latches, not illustrated, are arranged to be able to retain the bonnet in a closed position.

FIG. 1 illustrates the inner panel 2 as seen from below, i.e., from the side which is intended to face the engine compartment, when the bonnet is mounted in a vehicle. The inner panel 2 has a corresponding shape when seen from above, however the seats 8, 10 for the bonnet hinges and the seats 12, 14 bonnet latches would not be visible when seen from above. In the illustrated view, the inner panel 2 is seen in a plane coinciding with the longitudinal L and transverse T directions.

The central portion 6 has a longitudinal extension, a, and a transverse extension, b. The longitudinal extension, a, is determined along the longitudinal center-line C, while the transverse extension b is determined at the widest portion, as seen in the transverse direction T, of the central portion 6. The central portion 6 comprises a reinforcing framework 16. A portion of the framework 16 forms an arch-shaped member 18. The arch-shaped member 18 has a longitudinal extension, c, and a transverse extension, d. The longitudinal extension, c, of the arch-shaped member 18 is its longest extension in the longitudinal direction L. In the illustrated embodiment, the arch-shaped member 18 is symmetrical around the longitudinal center-line C, such that the longitudinal extension, c, is measured along the longitudinal center-line C. The longitudinal extension, c, of the arch-shaped member 18 fulfils $0.6a \leq c \leq a$, a being the longitudinal extension, a, of the central portion 6. The transverse extension, d, of the arch-shaped member 18 fulfils $0.6b \leq d \leq b$, b being the transverse extension, b, of the central portion 6. In the illustrated example of the FIG. 1, c is about 80% of a, and d is about 90% of b.

The inner panel 2 has a longitudinal extension, e, and a transverse extension, f. The longitudinal extension, e, is determined along the center-line C, while the transverse extension, f, is determined at the widest portion of the inner panel 2, as seen in the transverse direction T. The longitudinal extension, c, of the arch-shaped member 18 fulfils c≥0.3e, e being the longitudinal extension, e, of the inner panel 2. The transverse extension, d, of the arch-shaped member 18 fulfils d≥0.4f, f being the transverse extension, f, of the inner panel 2. In the illustrated example of the FIG. 1, c is about 45% of e, and d is about 65% of f.

As can be gleaned from FIG. 1, the arch-shaped member 18 has a non-circular shape. In the illustrated embodiment of FIG. 1, the arch-shaped member 18 has a parabolic shape. If a coordinate system is placed having its origin at a point O, where the arch-shaped member 18 intersects the center-line C, an x-axis in the transverse direction T and a y-axis in the longitudinal direction L, the arch-shaped member 18 would follow an curve form of $y=k1*x^2$. The coefficient k1 could be chosen, assuming x and y are given in millimeters, to be in an interval of 0.0005≤k1≤0.0030, preferably 0.0010≤k1≤0.0020. In the illustrated example k1 substantially equals 0.0015. Even if the illustrated embodiment shows an example where the arch-shaped member 18 has a parabolic shape, it is also feasible that the arch-shaped member 18 may have an elliptic shape. It is also feasible that the arch-shaped member may have a shape constituted by a plurality of curve segments, wherein one or more of the curve segments may follow a circular shape, an elliptic shape or a parabolic shape. It would also be feasible that one or more portions of the arch-shaped member is/are rectilinear. In principle, any arch-shaped shape, e.g., as known from architecture, would be possible.

The arch-shaped member 18 comprises a first end portion 20, which joins the peripheral portion 4 adjacent to the seat 8 for the first bonnet hinge, and a second end portion 22, which joins the peripheral portion 4 adjacent to the seat 10 for the second bonnet hinge.

The framework 16 further comprises a first latch member 24 extending between the arch-shaped member 18 and the peripheral portion 4 adjacent to the seat 12 for the first bonnet latch and a second latch member 26 extending between the arch-shaped member 18 and the peripheral portion 4 adjacent to the seat 14 for the second bonnet latch. The latch members 24, 26 together with the arch-shaped member 18 provide a rigid connection of the seats 8, 10 of the bonnet hinges with the seats 10, 12 of the bonnet latches. There is a rigid connection between a hinge seat 8; 10 and a latch seat 12; 14 on the same lateral side of the inner panel 2, as well as a rigid connection between a hinge seat and a latch seat diagonally over the central portion 6.

The framework 16 also comprises at least one secondary framework having a smaller longitudinal and/or a smaller transverse extension than the arch-shaped member 18, the at least one secondary framework being located within the arch-shaped member 18. The secondary framework helps to prevent the center of the bonnet from being pressed down by manual force.

In the illustrated embodiment of FIG. 1, the at least one secondary framework comprises an inner arch-shaped member 28 located within the arch-shaped member 18. The inner arch-shaped member 28 may have the same general shape as the arch-shaped member 18 or they may have different shapes. The inner arch-shaped member 28 may assume any of the shapes described above for the arch-shaped member 18. In the illustrated embodiment the inner arch-shaped member 28 has a parabolic shape, such that the arch-shaped member 28 and the inner arch-shaped member 28 form a set of parabolas. Their apexes coincide. There may also be one or more additional inner arch-shaped members.

The inner arch-shaped member 28 partly coincides with the arch-shaped member 18 in a portion 30 around the center-line C of the inner panel 2. If utilizing the same coordinate system as used above for the arch-shaped member 18, the inner arch-shaped member 28 would follow a curve shape of $y=k2*x^2$. The coefficient k2 could be chosen, assuming x and y are given in millimeters, to be in an interval of 0.0015≤k2≤0.0060, preferably 0.0020≤k2≤0.0040. In the illustrated example k2 substantially equals 0.0032. Since the inner arch-shaped member 28 is located within the arch-shaped member 18, it is usually preferred that k2>k1. However, it is also feasible that k2≤k1, e.g., for the cases that the origins of the arch-shaped member 18 and the inner arch-shaped member 28 do not coincide, as they do in the illustrated embodiment.

In the illustrated embodiment of FIG. 1, there is also another secondary framework in the form of a sun-shaped member 32 comprising a central ring 34, in the illustrated embodiment being a non-circular ring, and one or more connection members 36, 38, 40, 42 extending from the central ring 34 to the inner arch-shaped member 28. The sun-shaped structure 32 comprises a first connection member 36 extending from the central ring 34 in a direction towards the seat 12 of the first bonnet latch, a second connection member 38 extending in a direction towards the seat 14 of the second bonnet latch, a third connection member 40 extending in a direction towards the seat 8 of the first bonnet hinge and a fourth connection member 42 extending in a direction towards the seat 10 of the second bonnet hinge. The term "extending in a direction towards" is herein utilized to denote a direction; it does not mean that the connection members reach as far as to the seat 8, 10, 12, 14 of the bonnet latch or hinge. There is also an additional member 43 extending rearwards from the central ring 34 to the peripheral portion 4.

The framework 16 further comprises a front connection 44 extending substantially in the longitudinal direction L of the inner panel 2 adjacent to the center-line C. The front connection 44 connects the arch-shaped member 18 with the peripheral portion 4. In the illustrated embodiment, the front connection 44 comprises three members 46, 48, 50, but the number of members may also be one, two, four or more.

The central portion 6 comprises the framework 16 described above. In addition, the central portion 6 comprises open areas 52a-52l in between the elements of the framework 16 or between one and more of the elements of the framework 16 and the peripheral portion 4. In general the open areas are designed such that the corners are not too pointed. See for example the open area 52b between the arch-shaped member 18 and the inner arch-shaped member 28, wherein the arch-shaped member 18 in a smooth way joins with the inner arch-shaped member 28 when forming the common portion 30, such that it is avoided that the open area 52b ends with a sharp tip at its front end.

By utilizing an inner panel 2 like the one illustrated in the embodiment of FIG. 1, it is possible to provide an inner panel 2 having appropriate properties as regards to being able to withstand being pressed down by manual force, e.g., in the center of the central portion 2, and torsional rigidity, e.g., diagonally over the central portion 6, and yet keeping the weight at a desired low level. In addition, the bonnet comprising the inner panel 2 has appropriate properties as regards protection of a vulnerable road user landing on the bonnet.

Figure 2:
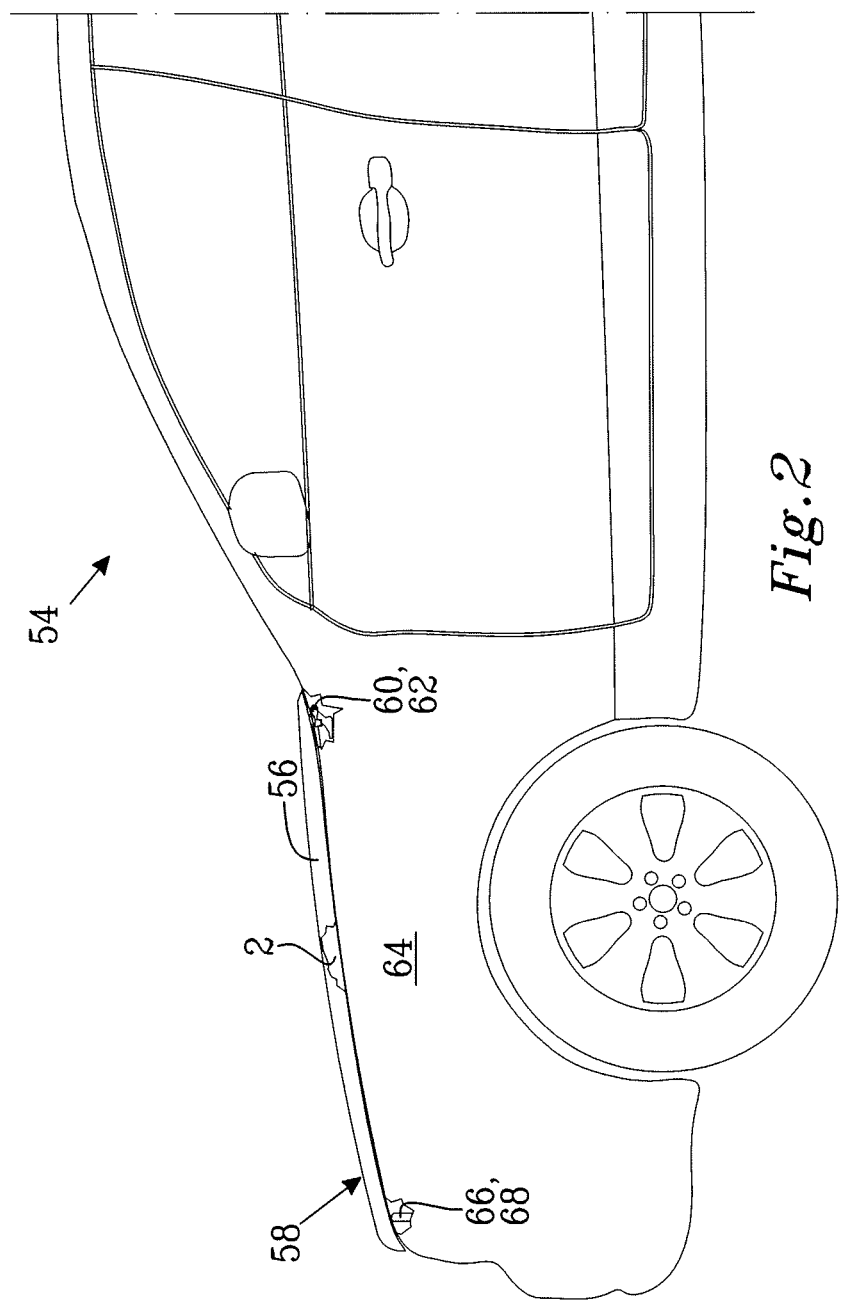
FIG. 2 shows a vehicle comprising a bonnet with the inner panel of FIG. 1.

The inner panel 2 together with an outer panel 56 forms a bonnet 58. FIG. 2 illustrates the bonnet 58 when mounted in a vehicle 54. The inner panel 2 provides seats 8, 10 for a first bonnet hinge 60 and a second bonnet hinge 62, which are arranged to provide a hinged connection between the bonnet 58 and a vehicle body 64. The inner panel 2 also provides seats 12, 14 for a first bonnet latch 66 and a second bonnet latch 68. The outer panel 56 provides the bonnet 58 with an outer surface are and thus covers the open areas 52a-52l. The inner panel 2 and the outer panel 56 may be attached to each other by an adhesive and/or hemming.

Figure 3:
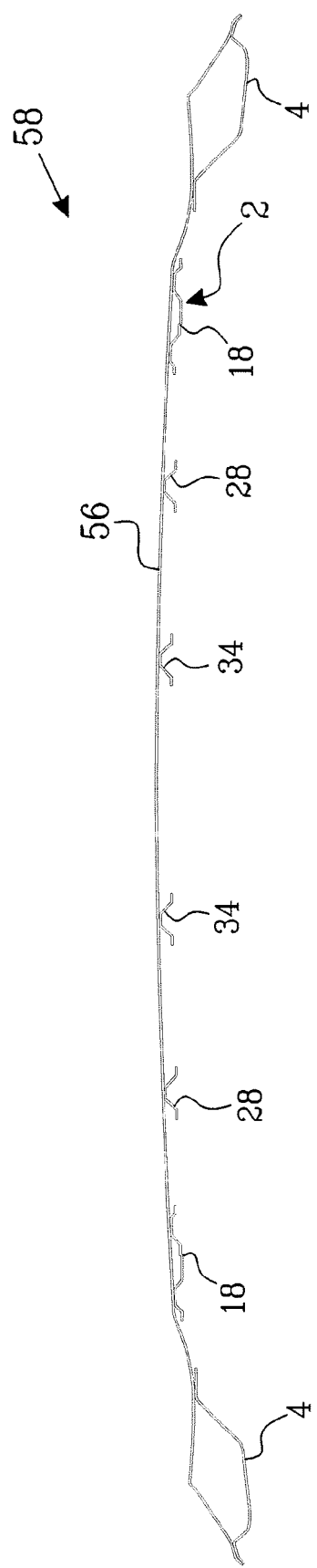
FIG. 3 shows a cross-section of the bonnet.

FIG. 3 illustrates a cross-section through the bonnet 58 along line 3-3 of FIG. 1. The outer panel 56 provides the bonnet 58 with an outer continuous surface. The outer panel 56 is somewhat curved adjacent to the lateral sides of the bonnet 58. The cross-section of the inner panel 2 passes, when going from the left-hand side to the center: the peripheral portion 4, the arch-shaped member 18, the inner arch-shaped member 28 and the central ring 34. Hence, the outer panel 56 is well supported by the inner panel 2.

Figure 4:
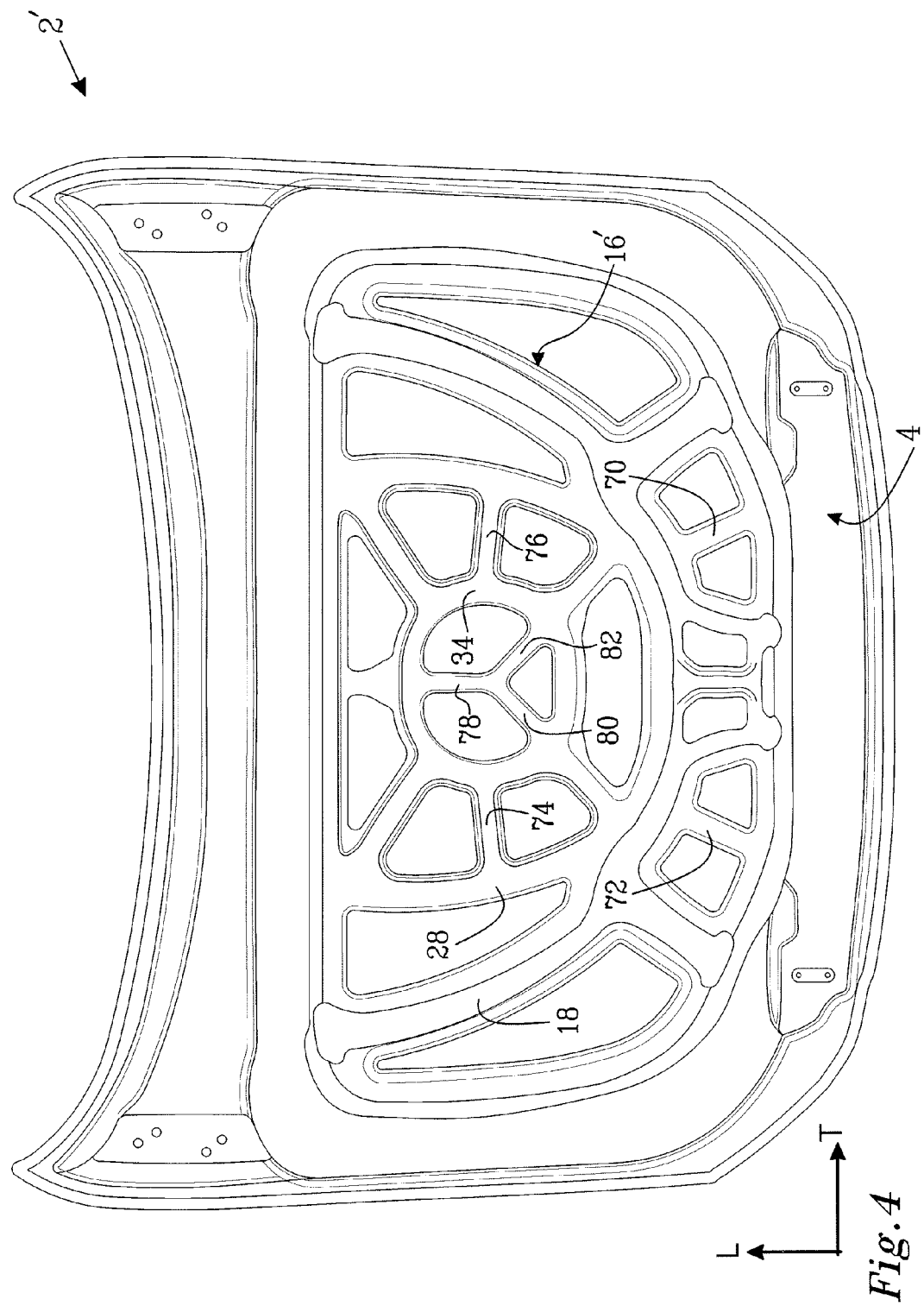
FIG. 4 shows an alternative embodiment of an inner panel.

FIG. 4 illustrates an inner panel 2' forming an alternative embodiment of the inner panel 2 of FIG. 1. Many details of the alternative embodiment are similar to those already described in conjunction with FIGS. 1-3, e.g., the peripheral portion 4, the arch-shaped member 18, the inner arch-shaped member 28 and the central ring 34, and will not be described again.

The framework 16' of the inner panel 2' of the alternative embodiment comprises a few optional additional members. There are two additional members 70, 72 extending between the arch-shaped member 18 and the peripheral portion 4 substantially in an oblique forward direction. There are also two additional members 74, 76 extending between the central ring 34 and the inner arch-shaped member 28 substantially in the transverse direction T. In addition, the central ring 34 comprises three additional members 78, 80, 82 crossing the center of the central ring 34. Similar as for the embodiment of FIG. 1, there are open areas in between the elements of the framework 16' or between one and more of the elements of the framework 16' and the peripheral portion 4.

The embodiment of FIG. 4 just shows an example. One, two, three or more of the additional members may be used, e.g., to span large open areas and/or where extra reinforcement is needed. Further additional members may be used. Preferably, the amount of, the dimensions of and the locations of the members of the framework are adapted to achieve the desired appropriate mechanical properties as mentioned above, and yet keep the weight at desired level. In addition, the bonnet comprising the inner panel desirably has appropriate properties as regards protection of a vulnerable road user being thrown onto the bonnet.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

What is claimed is:

1. An inner panel for a vehicle bonnet, the inner panel comprising:
    a peripheral portion extending along at least a portion of a periphery of the inner panel; and
    a central portion located within the peripheral portion and comprising a reinforcing framework, a portion of the framework forming an arch-shaped member;
    wherein the inner panel has a longitudinal extension along a longitudinal center-line and a transverse extension, and wherein a longitudinal extension of the arch-shaped member is equal to or greater than 30% of the longitudinal extension of the inner panel, and a transverse extension of the arch-shaped member is equal to or greater than 40% of the transverse extension of the inner panel.

2. The inner panel according to claim 1 wherein the longitudinal extension of the arch-shaped member is equal to or greater than 35% of the longitudinal extension of the inner panel, or the transverse extension of the arch-shaped member is equal to or greater than 50% of the transverse extension of the inner panel.

3. The inner panel according to claim 1 wherein the longitudinal extension of the arch-shaped member is equal to or greater than 40% of the longitudinal extension of the inner panel, or the transverse extension of the arch-shaped member is equal to or greater than 60% of the transverse extension of the inner panel.

4. The inner panel according to claim 1 wherein a radius of curvature of the arch-shaped member varies along the arch-shaped member.

5. The inner panel according to claim 1 wherein at least a portion of the arch-shaped member has a substantially circular, parabolic or elliptic shape.

6. The inner panel according to claim 1 wherein the arch-shaped member comprises a first end portion and a second end portion, wherein at least one of the end portions joins the peripheral portion adjacent to a seat for a bonnet hinge.

7. The inner panel according to claim 6 wherein the arch-shaped member extends from the peripheral portion adjacent to a seat for a first bonnet hinge to the peripheral portion adjacent to a seat for a second bonnet hinge.

8. The inner panel according to claim 1 wherein the framework further comprises a latch member extending between the arch-shaped member and the peripheral portion adjacent to a seat for a bonnet latch.

9. The inner panel according to claim 1 wherein the framework comprises a first latch member extending between the arch-shaped member and the peripheral portion adjacent to a seat for a first bonnet latch, and a second latch member extending between the arch-shaped member and the peripheral portion adjacent to a seat for a second bonnet latch.

10. The inner panel according to claim 1 wherein the framework further comprises a secondary framework having a smaller longitudinal extension or a smaller transverse extension than the arch-shaped member, the secondary framework being located within the arch-shaped member.

11. The inner panel according to claim 10 wherein the secondary framework comprises an inner arch-shaped member.

12. The inner panel according to claim 11 wherein the secondary framework comprises a sun-shaped structure comprising a central ring and one or more connection members extending from the central ring to at least one of the arch-shaped member, the peripheral portion or the inner arch-shaped member, the sun-shaped structure being located within the arch-shaped member or within the inner arch-shaped member.

13. The inner panel according to claim 12 wherein the sun-shaped structure comprises a first connection member extending from the central ring in a direction toward a seat for a first bonnet latch, a second connection member extending from the central ring in a direction toward a seat for a second bonnet latch, a third connection member extending from the central ring in a direction toward a seat for a first bonnet hinge and/or a fourth connection member extending from the central ring in a direction toward a seat for a second bonnet hinge.

14. The inner panel according to claim 1 wherein the framework further comprises a front connection extending substantially in a longitudinal direction adjacent to the longitudinal center-line of the inner panel connecting the arch-shaped member with the peripheral portion.

15. The inner panel according to claim 1 wherein the inner panel comprises at least one open area.

16. A bonnet for a vehicle, the bonnet comprising an inner panel according to claim 1 and an outer panel attached to the inner panel.

17. The inner panel according to claim 1 wherein the arch-shaped member has a front portion and two spaced-apart end portions, and the front portion is disposed forwardly of the two end portions.

18. The inner panel according to claim 1 wherein the longitudinal extension of the arch-shaped member is equal to or greater than 35% of the longitudinal extension of the inner panel, and the transverse extension of the arch-shaped member is equal to or greater than 50% of the transverse extension of the inner panel.

19. The inner panel according to claim 1 wherein the longitudinal extension of the arch-shaped member is equal to or greater than 40% of the longitudinal extension of the inner panel, and the transverse extension of the arch-shaped member is equal to or greater than 60% of the transverse extension of the inner panel.

20. The inner panel according to claim 1 wherein the arch-shaped member comprises a first end portion and a second end portion, wherein at least one of the end portions joins the peripheral portion.

* * * * *